United States Patent
Shimizu

(10) Patent No.: US 7,463,301 B2
(45) Date of Patent: Dec. 9, 2008

(54) OPTICAL LOW PASS FILTER WITH VIBRATING OPTICAL PLATE, AND CAMERA

(75) Inventor: Yasuo Shimizu, Yokohama (JP)

(73) Assignee: Nikon Corporation, Tokyo (JP)

( * ) Notice: Subject to any disclaimer, the term of this patent is extended or adjusted under 35 U.S.C. 154(b) by 487 days.

(21) Appl. No.: 11/049,749

(22) Filed: Feb. 4, 2005

(65) Prior Publication Data
US 2005/0179806 A1    Aug. 18, 2005

(30) Foreign Application Priority Data
Feb. 13, 2004    (JP)    ............... 2004-036606

(51) Int. Cl.
*H04N 5/225*    (2006.01)
(52) U.S. Cl. .................. 348/335; 348/342; 359/308
(58) Field of Classification Search ................. 348/335, 348/342, 340; 359/308
See application file for complete search history.

(56) References Cited

U.S. PATENT DOCUMENTS 6,356,379 B1 * 3/2002 Kreymerman ......... 348/E5.028
6,473,120 B2 * 10/2002 Hirasawa et al. ......... 348/208.1
6,587,148 B1    7/2003 Takeda et al.
7,280,145 B2 * 10/2007 Takizawa et al. ............ 348/340

FOREIGN PATENT DOCUMENTS

| EP | 0 804 039 A1 | 10/1997 |
| JP | A 06-189318 | 7/1994 |
| JP | A 09-069985 | 3/1997 |
| JP | A 2000-138849 | 5/2000 |
| WO | WO 01/43426 A1 | 6/2001 |

* cited by examiner

*Primary Examiner*—Lin Ye
*Assistant Examiner*—Gevell Selby
(74) *Attorney, Agent, or Firm*—Oliff & Berridge, PLC.

(57) ABSTRACT

A plane parallel plate 91 constituted with optical glass and disposed further frontward relative to an image-capturing element 10 is caused to swing and vibrate by alternately expanding and contracting piezoelectric elements 92a and 92c. As the plane parallel plate 91 becomes slanted relative to the image-capturing element 10, the angle of incidence of subject light 20 changes, causing the position of the subject image projected on the image-capturing element 10 to move from point A to point B. As a result, the image forming position vibrates parallel to the x-axis, thereby enabling the plane parallel plate 91 to function as a low pass filter for the spatial frequency manifesting along the x direction.

29 Claims, 7 Drawing Sheets

OPTICAL LOW PASS FILTER WITH VIBRATING OPTICAL PLATE, AND CAMERA

The disclosure of the following priority application is herein incorporated by reference:

Japanese Patent Application No. 2004-036606 filed Feb. 13, 2004

BACKGROUND OF THE INVENTION

1. Field of the Invention

The present invention relates to an optical low pass filter that may be used in conjunction with an image-capturing element or the like and a camera having the optical low pass filter.

2. Description of Related Art

A subject image is captured with a solid state image-capturing element that may be a CCD element, a MOS element or the like in an electronic camera such as a digital still camera or a video camera. As light-receiving pixels are arrayed in a regular pattern in such an image-capturing element, the array pattern with which the light-receiving pixels are arranged and the pattern in the subject image tend to induce phenomena such as moire fringes and color artifact. Under normal circumstances, an optical low pass filter constituted with a birefringent plate made of quartz, lithium niobate ($LiNBO_3$) or the like is disposed to the front of the image-capturing element in order to eliminate the adverse effects of these phenomena. In addition, another solution whereby the image-capturing element is caused to vibrate within the image-capturing plane (Japanese Laid Open Patent Publication No. H6-189318) has been proposed as an alternative to the use of an optical low pass filter made of quartz or the like.

SUMMARY OF THE INVENTION

However, the optical low pass filter constituted with the birefringent plate mentioned above is less than ideal as a solution since the birefringent plate is expensive. In addition, since the cutoff frequency of a birefringent plate is fixed, an optical low pass filter needs to be provided in correspondence to each specific pixel pitch that the image-capturing element may assume. Furthermore, since birefringence manifests along a single direction, a plurality of birefringent plates must be utilized in order to achieve a low pass effect along a plurality of directions in correspondence to the pixel array. The structure having an image-capturing element that vibrates, on the other hand, is problematic in that the vibration may adversely affect the image-capturing element.

According to the 1st aspect of the invention, an optical low pass filter comprises: a plane parallel plate that comprises a transparent optical member and is disposed frontward relative to an image-capturing surface of an image-capturing element that captures a subject image formed with a photographic optical system; and a drive unit that drives the plane parallel plate so as to eliminate a spatial frequency component in the subject image which is equal to or higher than a predetermined cutoff frequency.

According to the 2nd aspect of the invention, in the optical low pass filter according to the 1st aspect, it is preferred that the drive unit causes the plane parallel plate to vibrate so as to alter an angle formed by the plane parallel plate and the image-capturing surface when an image is captured by the image-capturing element.

According to the 3rd aspect of the invention, in the optical low pass filter according to the 2nd aspect, it is preferred that there is further provided an amplitude change unit that changes an amplitude of vibration of the plane parallel plate.

According to the 4th aspect of the invention, in the optical low pass filter according to the 1st or 2nd aspect, it is preferred that: the drive unit comprises a plurality of oscillators disposed at the plane parallel plate, and a control unit that causes the plurality of oscillators to vibrate while interlocking with one another.

According to the 5th aspect of the invention, in the optical low pass filter according to the 4th aspect, it is preferred that: the control unit controls the plurality of oscillators so as to cause the subject image projected on the image-capturing surface to move on a straight locus, a circular locus or an elliptical locus by adjusting at least one of amplitudes and phases of the plurality of oscillators.

According to the 6th aspect of the invention, in the optical low pass filter according to the 1st aspect, it is preferred that: the plane parallel plate achieves birefringence; and the drive unit causes the plane parallel plate to vibrate so as to eliminate the spatial frequency component in the subject image manifesting along a direction different from a direction along which a birefringent split is achieved at the plane parallel plate.

According to the 7th aspect of the invention, in the optical low pass filter according to the 6th aspect, it is preferred that there is further provided an amplitude change unit that changes an amplitude of vibration of the plane parallel plate.

According to the 8th aspect of the invention, in the optical low pass filter according to the 1st aspect, it is preferred that the plane parallel plate comprises an isotropic transparent optical member.

According to the 9th aspect of the invention, in the optical low pass filter according to the 1st aspect, it is preferred that the plane parallel plate comprises isotropic glass.

According to the 10th aspect of the invention, in the optical low pass filter according to the 1st aspect, it is preferred that the drive unit drives the plane parallel plate so as to cause the subject image to vibrate on the image-capturing surface of the image-capturing element.

According to the 11th aspect of the invention, in the optical low pass filter according to the 3rd aspect, it is preferred that the amplitude is determined based upon the predetermined cutoff frequency.

According to the 12th aspect of the invention, in the optical low pass filter according to the 4th aspect, it is preferred that: the control unit controls vibrations of the plurality of oscillators so as to achieve a first vibration pattern with which the plurality of oscillators are individually caused to vibrate with specific amplitudes and specific phases and a second vibration pattern in which at least one of the amplitude and the phase of at least one of the plurality of oscillators is altered relative to the first vibration pattern; and filtering characteristics achieved with the first vibration pattern are different from filtering characteristics achieved with the second vibration pattern.

According to the 13th aspect of the invention, in the optical low pass filter according to any of the 1st through 12th aspects, it is preferred that the drive unit turns on a low pass filter function by turning on drive of the plane parallel plate and turns off the low pass filter function by turning off the drive of the plane parallel plate.

According to the 14th aspect of the invention, a camera comprises: an image-capturing element that captures a subject image formed with a photographic optical system; and an optical low pass filter according to any of the 1st through 13th aspect.

It is to be noted that the drive unit, the amplitude change unit and the control unit mentioned above may be respectively replaced with a drive means, an amplitude change means and a control means.

DESCRIPTION OF PREFERRED EMBODIMENTS

Figure 1:
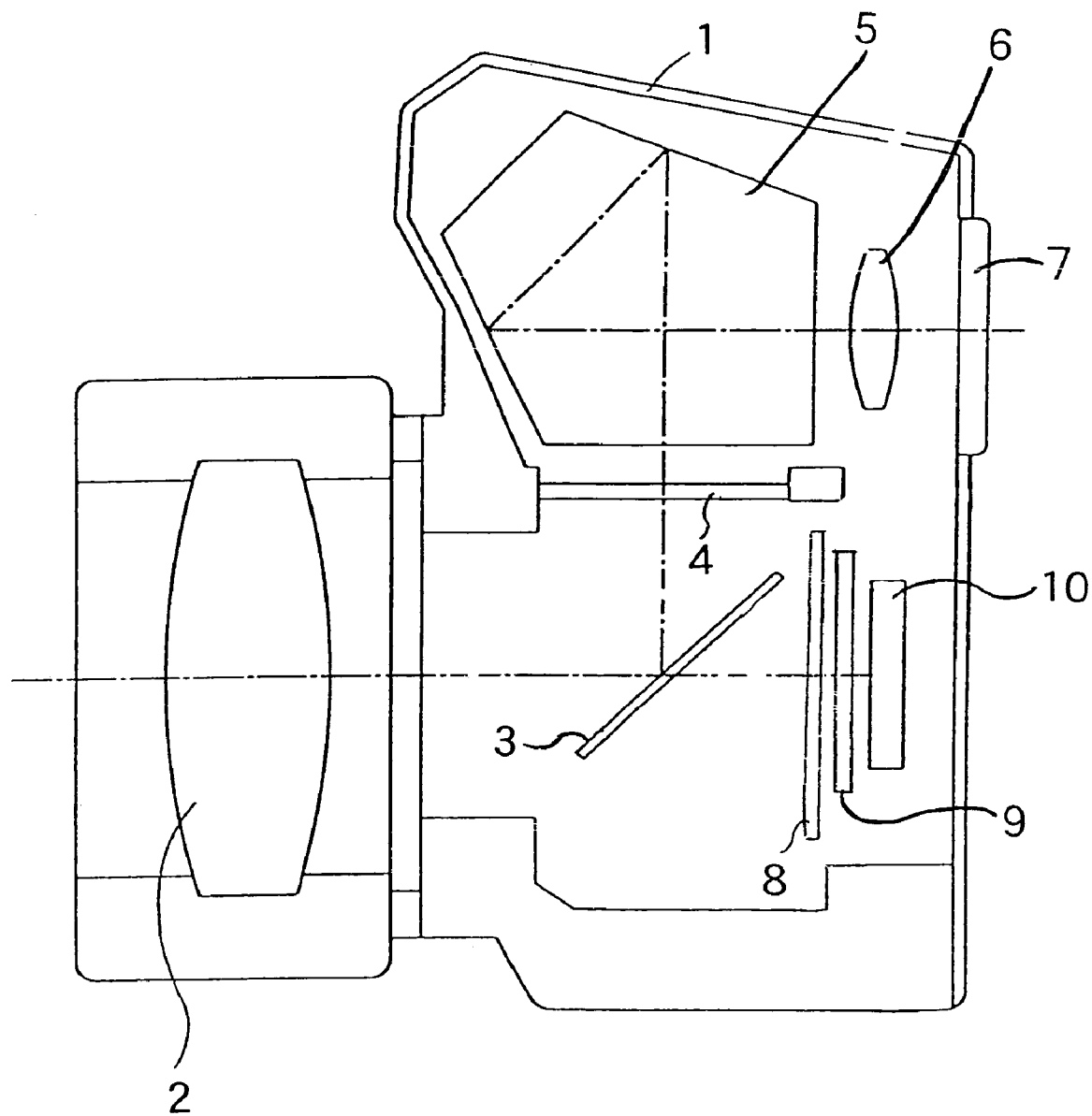
FIG. 1 is a sectional view schematically illustrating the structure of a digital still camera mounted with an optical low pass filter according to the present invention.

The following is an explanation of preferred embodiments of the present invention, given in reference to the drawings. FIG. 1 is a sectional view schematically showing the structure of a digital still camera mounted with an optical low pass filter according to the present invention. The digital still camera in FIG. 1 is in a non-photographing state. Subject light having passed through a photographic lens 2 of the camera 1 is reflected at a quick return mirror 3 and a subject image is formed on a focusing glass 4. The subject image formed on the focusing glass 4 can be observed through a viewfinder eyepiece window 7 via a pentaprism 5 and an eyepiece lens 6.

A shutter 8, an optical low pass filter 9 and an image-capturing element 10 are disposed in this order on the optical axis of the quick return mirror 3 on its rear side. The image-capturing element 10 is a two-dimensional image-capturing device which may assume any of various modes including a CCD-type device, a MOS-type device and a CID-type device. After the quick return mirror 3 is caused to swing upward and thus retreats out of the optical path, the shutter 8 is opened and closed to capture the subject image with the image-capturing element 10.

Figure 2A:
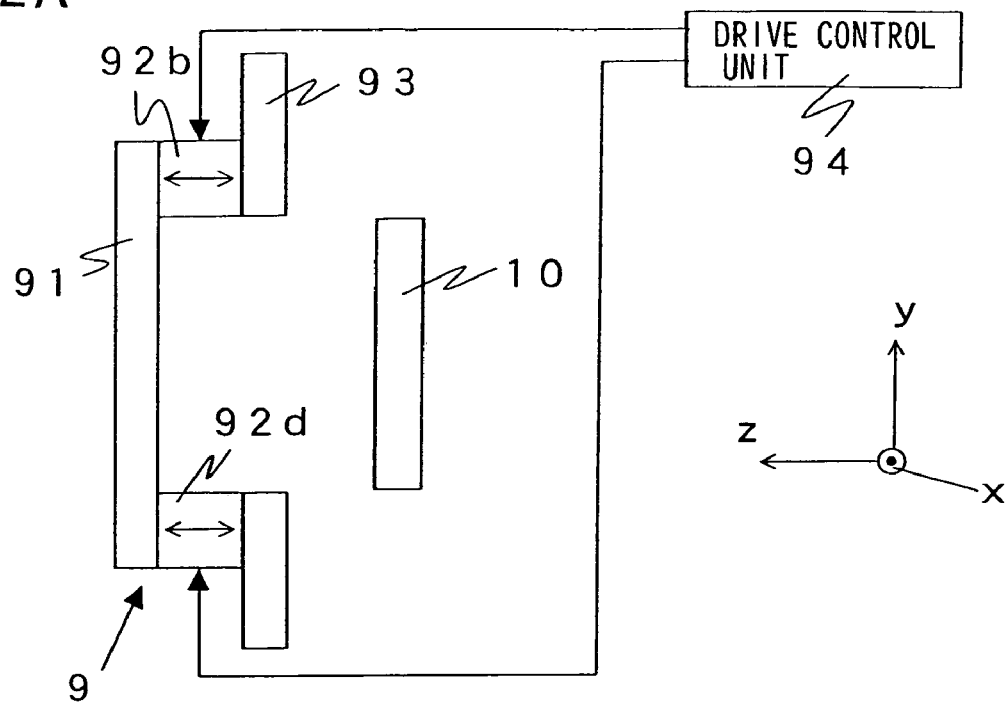
FIGS. 2A and 2B illustrate the optical low pass filter, with FIG. 2A presenting its side elevation and FIG. 2B showing the optical low pass filter viewed from the image-capturing element side.
Figure 2B:
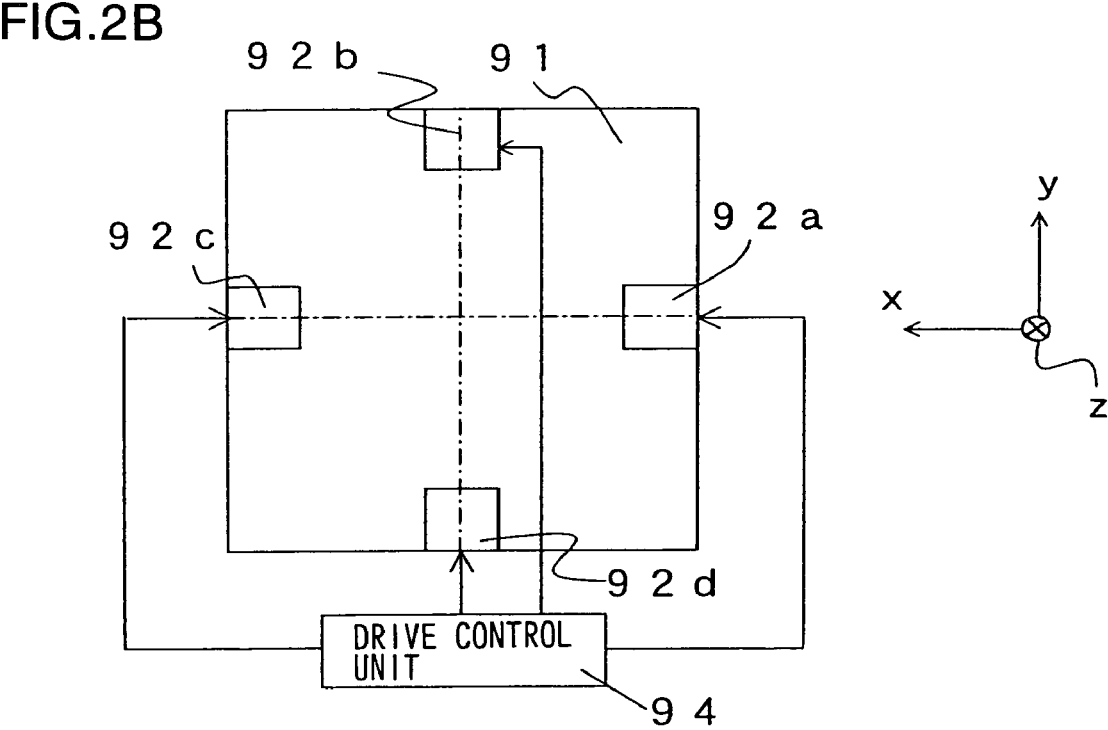

FIGS. 2A and 2B illustrate the optical low pass filter 9, with FIG. 2A presenting a side elevation and FIG. 2B showing the optical low pass filter viewed from the image-capturing element side. The optical low pass filter 9 includes a plane parallel plate 91 constituted with a transparent optical member made of optical glass or the like and piezoelectric elements 92a to 92d which are oscillators or vibrators and constituted of barium titanate, PZT or the like. The plane parallel plate 91 is fixed to a base member 93 via the piezoelectric elements 92a to 92d. The base member 93, which is fixed at a specific position relative to the image-capturing element 10, holds the plane parallel played 9 paralleled to the image-capturing surface of the image-capturing element 10 as long as the piezoelectric elements 92a to 92d are not engaged in operation.

As shown in FIG. 2B, the plane parallel plate 91 assumes a square shape, and the piezoelectric elements 92a to 92d are disposed on the edges of the plane parallel plate 91 on its rear side (toward the image-capturing element). The piezoelectric elements 92a to 92d are each disposed at the middle point of a side of the plane parallel plate 91, with the piezoelectric elements 92a and 92c set along the x-axis, and the piezoelectric elements 92b and 92d set along the y-axis. As a voltage is applied to the individual piezoelectric elements 92a to 92d from a drive control unit 94, the piezoelectric elements 92a to 92d become displaced along the optical axis (along the z direction) as indicated by the arrows in FIG. 2A. The drive control unit 94 is capable of individually applying voltages to each of the piezoelectric elements 92a to 92d independently of one another.

In the embodiment, the piezoelectric elements 92a to 92d are driven by allowing them to interlock with one another, so as to slant the plane parallel plate 91 relative to the image-capturing surface. Thus, the subject image projected on the image-capturing surface is caused to move so as to vibrate on the image-capturing plane. As the subject image vibrates in correspondence to the pixel pitch at the image-capturing element 10, advantages similar to those achieved through the use of an optical low pass filter constituted with a birefringent plate are realized.

It is to be noted that the term "birefringent plate" refers to an optical plate constituted of an anisotropic crystal such as quartz. The plane parallel plate 91 used in the embodiment, on the other hand, is an optical place constituted with a transparent optical member such as isotropic optical glass. Namely, the plane parallel played 91 is an optical plate with no anisotropic characteristics or birefringent characteristics.

Figure 3A:
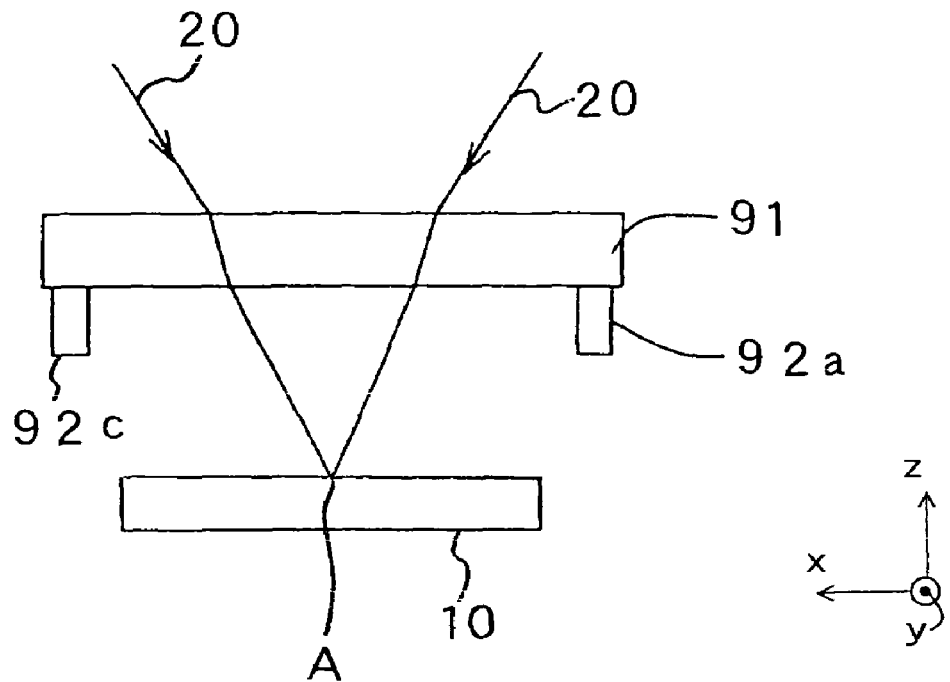
FIGS. 3A and 3B illustrate the relationship between the slanted attitude of the plane parallel plate and the position at which the subject image is projected on the image-capturing surface, with the FIG. 3A showing the relationship manifesting when the applied voltage is equal to 0 and FIG. 3B showing the relationship manifesting when a specific voltage is applied to the piezoelectric elements.
Figure 3B:
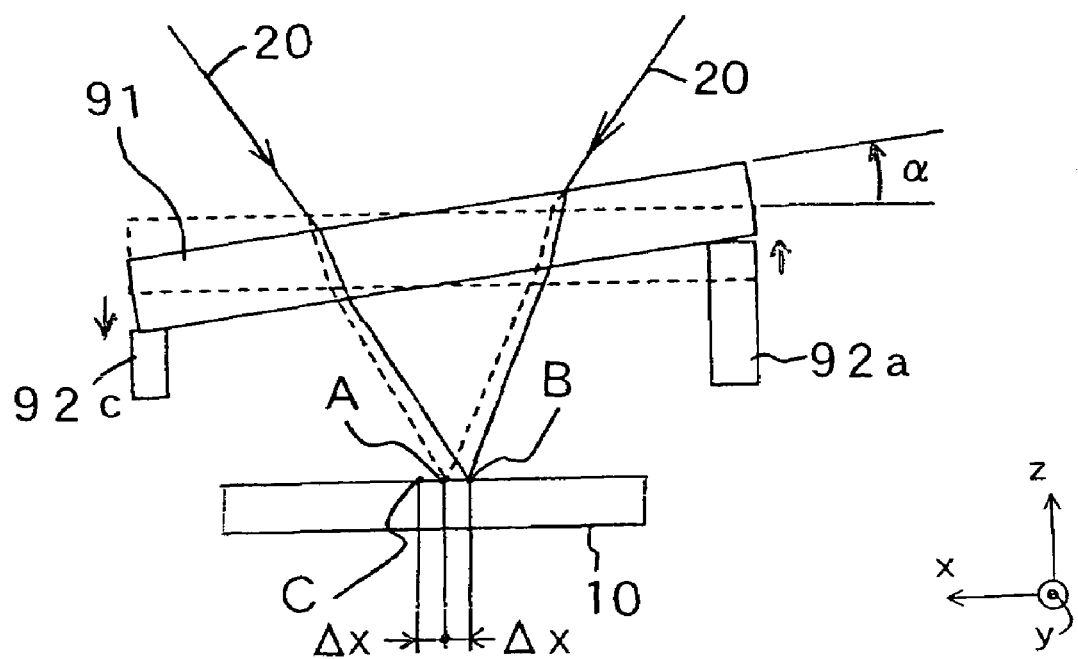

FIGS. 3A and 3B show the relationship between the slanting attitude of the plane parallel plate 91 and the position at which the subject image is projected on the image-capturing surface. FIG. 3A shows a state in which no drive voltage is applied to the individual piezoelectric elements 92a to 92d and the plane parallel plate 91 is set parallel to the image-capturing surface of the image-capturing element 10. Under these circumstances, an image formed with subject light 20 is projected at a point A on the image-capturing surface. FIG. 3B shows a state in which a voltage is applied to the piezoelectric elements 92a and 92c set along the x-axis, thereby causing the piezoelectric element 92a to expand and the piezoelectric element 92c to contract.

As the piezoelectric elements 92a and 92c expand and contract, the plane parallel plate 91 swings relative to the y-axis and becomes slanted by an angle α from the state shown in FIG. 3A. Namely, it becomes slanted relative to the image-capturing surface by the angle α. As the plane parallel plate 91 becomes slanted, the angle of incidence of the subject light flux 20 at the plane parallel plate 91 changes. As a result, the position at which the subject image is projected moves from the point A to a point B distanced from the point A by Δx along the x direction. In contrast, if the piezoelectric element 92a is compressed and the piezoelectric element 92c is expanded, the projection position moves to a point C distanced by Δx from the point A on the opposite side from the point B. Namely, if the piezoelectric elements 92a and 92c are expanded and contracted continuously, the projection position vibrates between the point A and the point C with an amplitude 2 Δx. By ensuring that the amplitude 2 Δx is greater than the pixel pitch at the image-capturing element 10, the vibrating plane parallel plate 91 can be made to function as an optical low pass filter.

Figure 4A:
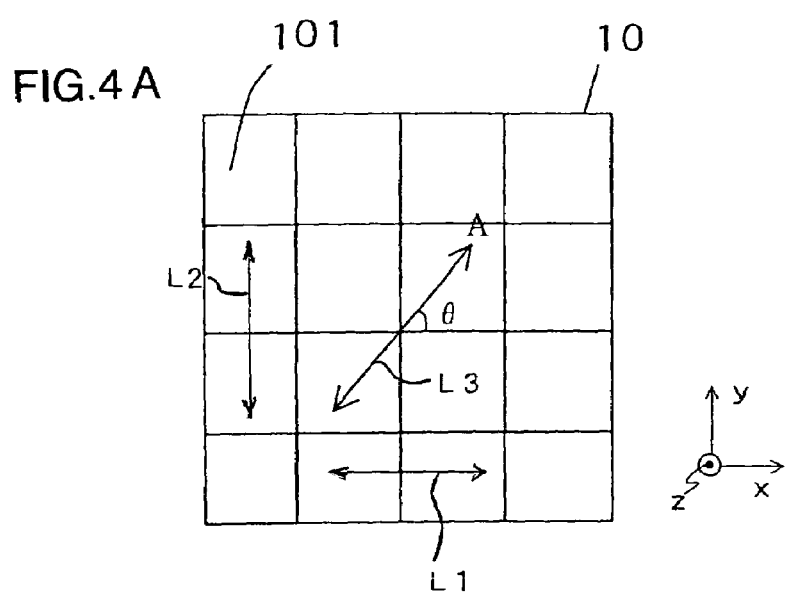
FIGS. 4A to 4C each show a locus along which the subject image projection position moves on the image-capturing surface, with FIG. 4A showing a straight locus, FIG. 4B showing a circular locus and FIG. 4C showing an elliptical locus.
Figure 4B:
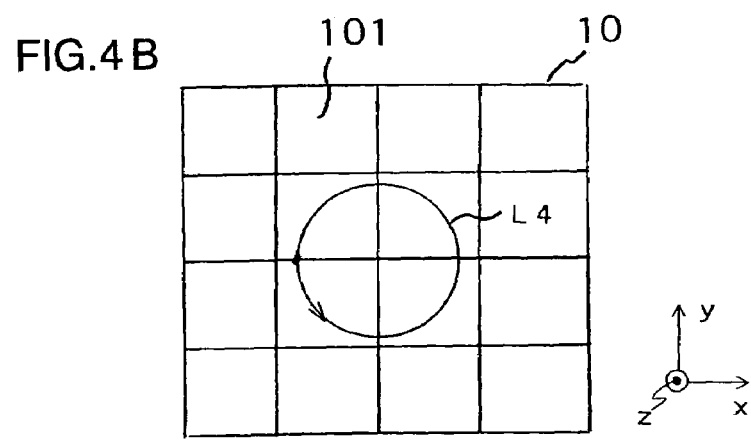
Figure 4C:
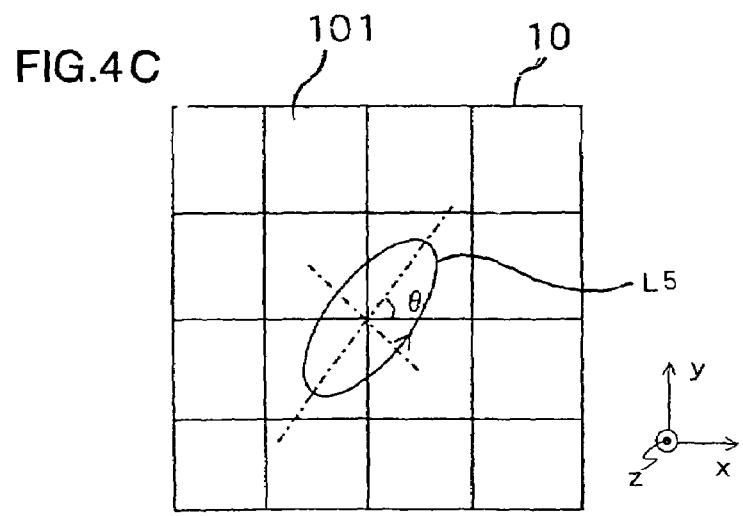

FIGS. 4A to 4C each show a locus on which the subject image projection position moves on the image-capturing surface in an enlargement of part of the image-capturing surface viewed from the side on which the plane parallel plate 91 is disposed. In FIGS. 4A to 4C, reference 101 indicates a pixel and a plurality of pixels 101 are disposed along the x direction and the y direction in a lattice pattern. The locus L1 in FIG. 4A is a locus of the projection position achieved by subjecting the piezoelectric elements 92a and 92c disposed along the x-axis as shown in FIG. 3B to expanding and contracting vibration with phases opposite from each other. Since the plane parallel plate 91 swings and vibrates on the y-axis under these circumstances, the projection position vibrates parallel to the x-axis on the locus L1. Thus, when the plane parallel plate 91 is caused to swing and vibrate in this manner, the optical low pass filter 9 (see FIG. 1) functions as a low pass filter for the spatial frequency along the x-axis.

By subjecting the piezoelectric elements 92b and 92d disposed along the y-axis to expanding vibration with phases opposite from each other, the plane parallel plate 91 is caused to swing and vibrate on the x-axis and thus, the subject image projection position vibrates along the y direction on the locus L2. In addition, as the individual piezoelectric elements 92a to 92d are vibrated as shown in FIG. 5 by controlling the voltages applied to the individual piezoelectric elements 92a to 92d, the projection position vibrates along a diagonal direction relative to the x-axis and the y-axis on the locus L3.

The oscillation frequency of the piezoelectric elements 92a to 92d is approximately 30 kHz. However, the frequency may assume another value. It should be set to a value at which the plane parallel plate 91 swings (or rocks) and vibrates a plurality of times within the exposure period.

Figure 5:
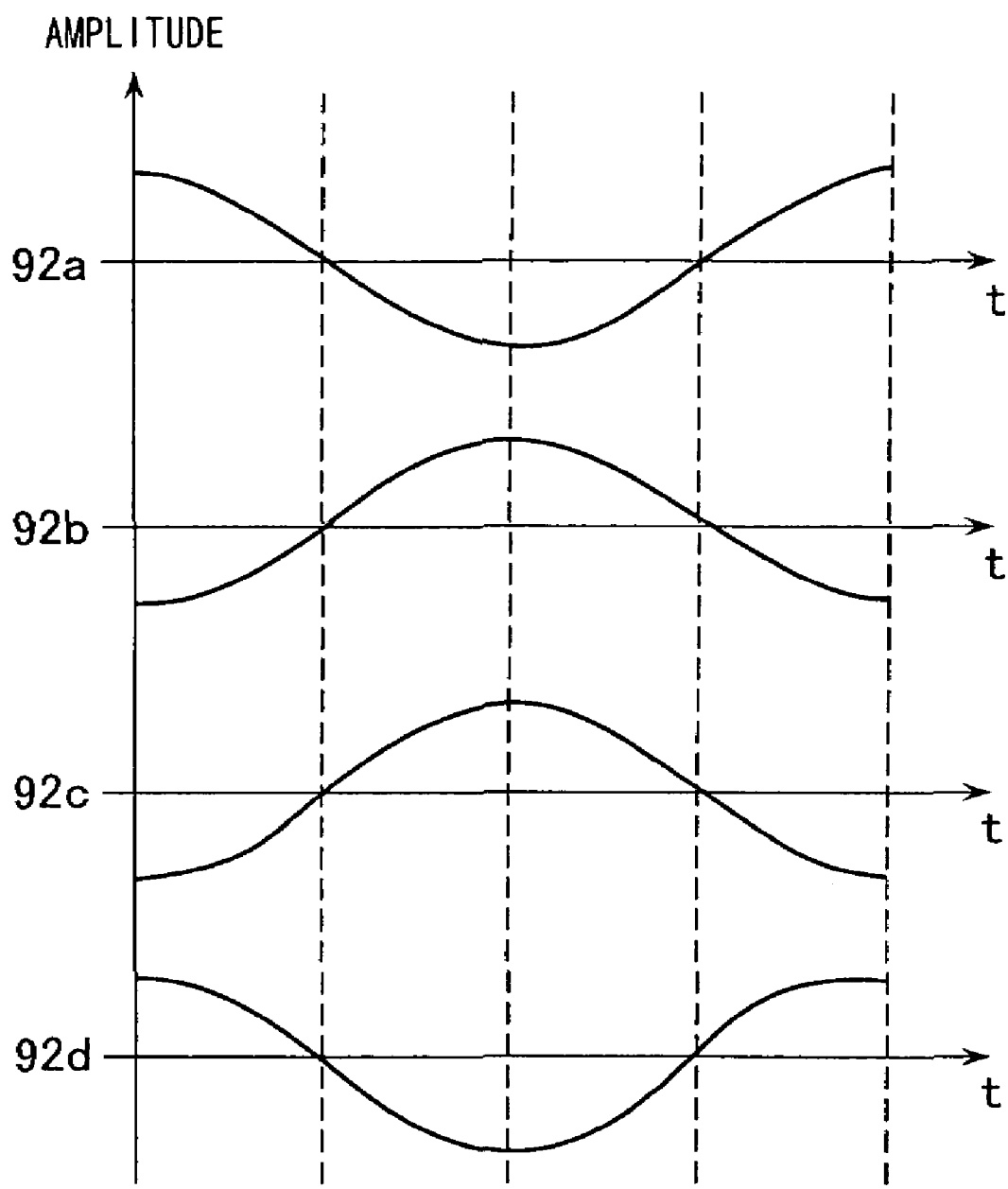
FIG. 5 shows changes occurring over time in the amplitudes of the piezoelectric elements 92a to 92d when the image projection position moves on the locus L3.

FIG. 5 shows changes occurring over time in the amplitude of the individual piezoelectric elements 92a to 92d. The piezoelectric elements 92a and 92d vibrate with phases matching each other, whereas the piezoelectric elements 92b and 92c vibrate with phases matching each other. In addition, the piezoelectric elements 92a and 92d vibrate with a phase opposite from the phase of the piezoelectric elements 92b and 92c, offset from the phase of the piezoelectric elements 92b and 92c by 180°. If the amplitudes of the piezoelectric elements 92a to 92d are all set equal to one another, for instance, the angle θ formed relative to the x-axis is 45°.

Figure 6:
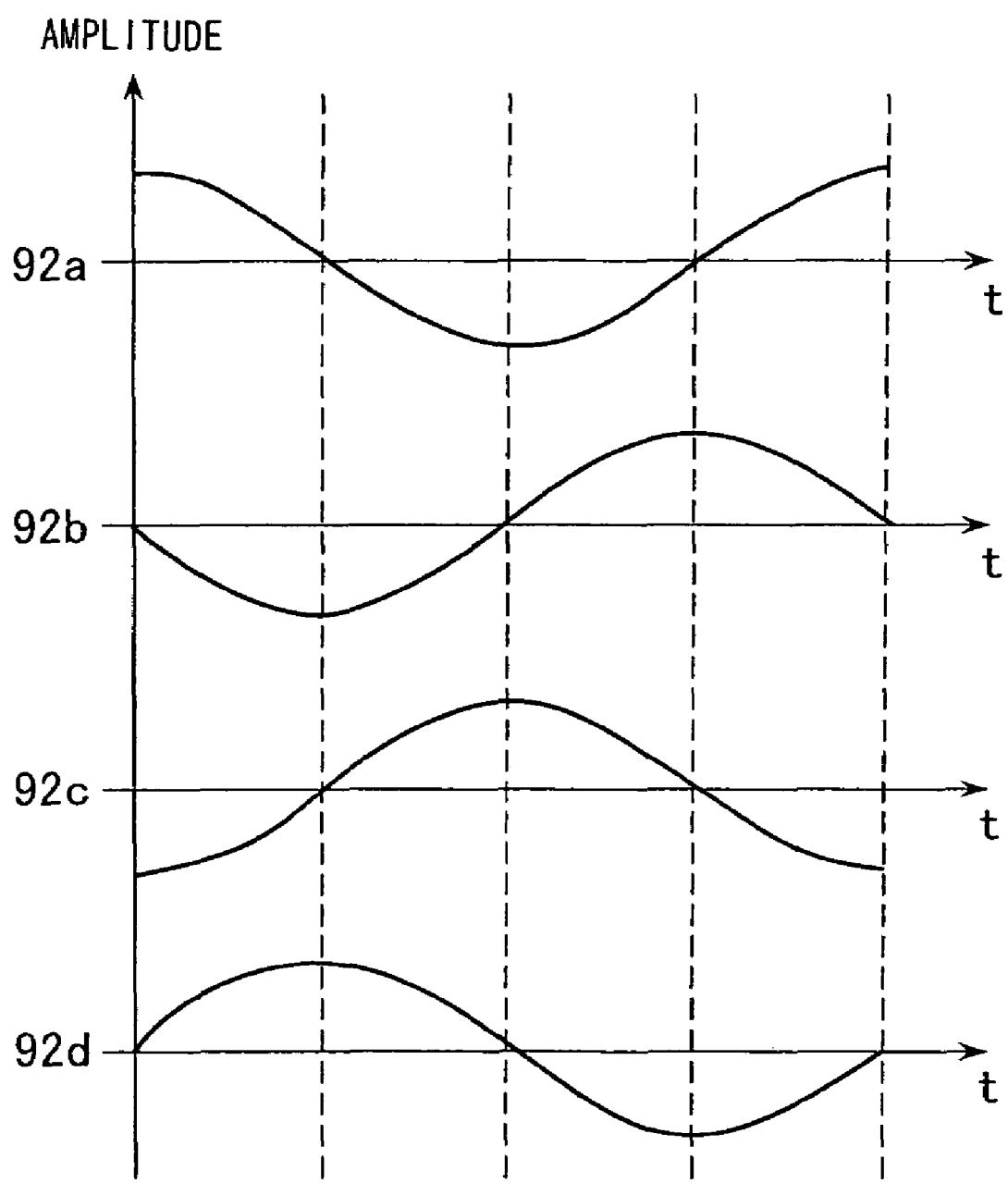
FIG. 6 shows changes occurring over time in the amplitudes of the piezoelectric elements 92a to 92d when the image projection position moves on the locus L4.

FIG. 4B shows a locus on which the projection position moves when another vibration mode (vibration pattern) is adopted, and FIG. 6 shows the corresponding changes occurring over time in the amplitudes of the individual piezoelectric elements 92a to 92d. As shown in FIG. 6, the phases of the piezoelectric elements 92a to 92d are sequentially offset by 90° in the order of; 92a->92b->92c->92d. As a result, the projection position moves in a counterclockwise circle on the locus L4 in FIG. 4B.

An optical low pass filter in the related art requires two birefringent plates in order to split a light beam at four points along two directions. In contrast, the embodiment achieves an optical low pass effect along all directions by moving the projection position on the circular locus L4. Thus, it provides advantages equivalent to those of the optical low pass filter in the related art which utilizes two birefringent plates in conjunction with pixels arranged in a lattice array. In addition, even when the image-capturing element 10 has a large area, only the size of the plane parallel plate 91, which is inexpensive compared to birefringent plates constituted of quartz or the like, needs to be increased, and for this reason, the increase in the production cost can be minimized.

FIG. 4C shows an elliptical locus L5 achieved by modifying the circular locus L4. The optical low pass effect along all directions can also be achieved by moving the projection position on the elliptical locus L5 instead of the circular locus L4 and, at the same time, the width of the separation along the major axis and the width of separation along the minor axis can be set to values different from each other. By adjusting the levels of the voltages applied to the individual piezoelectric elements 92a to 92d and the phases of the individual piezoelectric elements 92a to 92d as described above, the projection position can be made to move on various loci.

While the plane parallel plate 91 is constituted with an optical glass plate in the embodiment explained above, it may be constituted with a birefringent plate instead of an optical glass plate. In such a case, a light flux can be split in two directions with a single birefringent plate by setting the direction along which the light is split with the plane parallel plate 91 and the direction along which the light is split with the birefringent plate different from each other. For instance, if the light is split along the x direction with the plane parallel plate 91 on the locus L1, as shown in FIG. 4A, the light is split along the y direction with the birefringent plate.

Figure 7A:
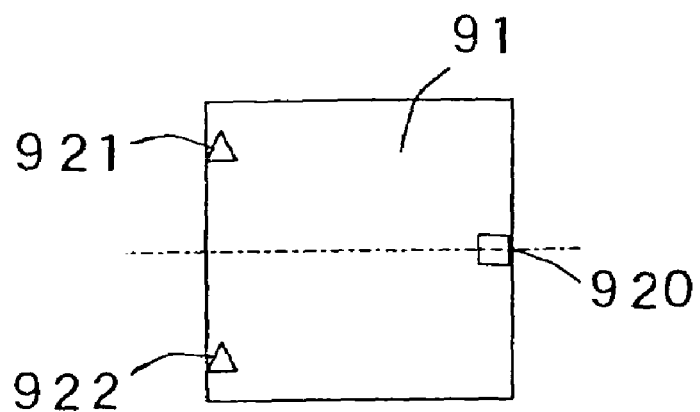
FIGS. 7A to 7C present examples of alternative piezoelectric element arrangements, with FIG. 7A showing an arrangement that includes a single piezoelectric element, FIG. 7B showing an arrangement having 2 piezoelectric elements and FIG. 7C showing an arrangement having 3 piezoelectric elements.
Figure 7B:
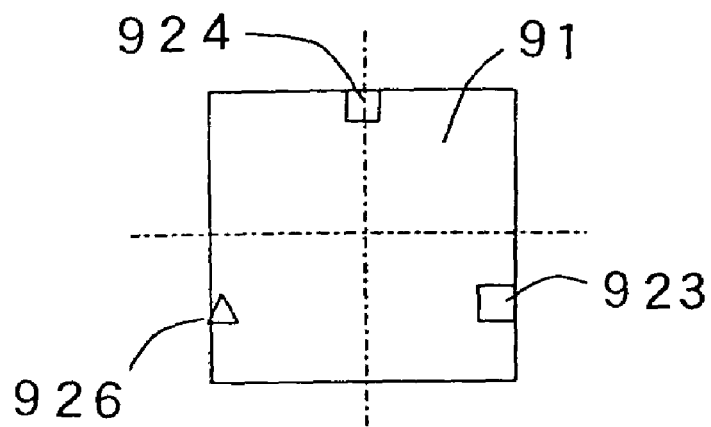
Figure 7C:
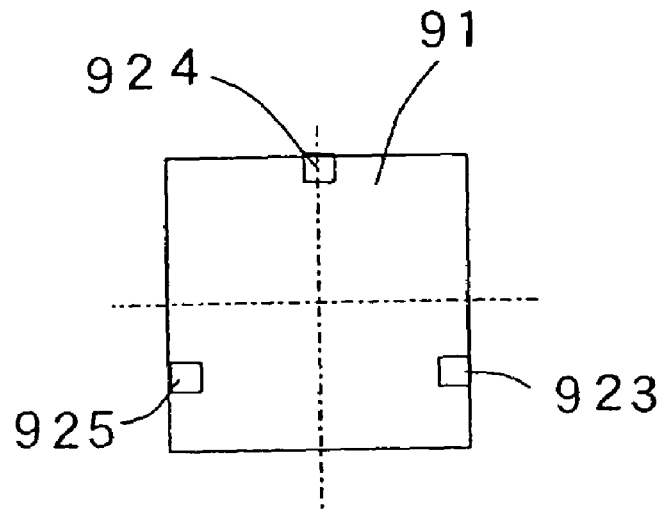

While four piezoelectric elements are used in the embodiment described above to swing and vibrate the plane parallel plate 91, any of various modes may be adopted with regard to the piezoelectric element arrangement. FIGS. 7A to 7C present three different arrangement examples. FIG. 7A shows an example in which a single piezoelectric element is used, with reference numeral 920 indicating the piezoelectric element and reference numerals 921 and 922, each indicating a fulcrum. FIG. 7B shows an example having two piezoelectric elements, with reference numerals 923 and 924 indicating the piezoelectric elements and reference 926 indicating a fulcrum. FIG. 7C shows an example in which three piezoelectric elements 923 to 925 support the plane parallel plate 91.

It is to be noted that a photographing operation may be performed in a single lens reflex digital camera which may include a detachable optical low pass filter by detaching or disengaging the optical low pass filter in order to obtain a photographic image with high resolution. In the related art, detaching and reattaching the optical low pass filter is not a simple process and there is a concern that the optical low pass filter may become damaged while it is being detached and reattached. In contrast, the optical low pass effect can be turned off with ease, simply by turning off the voltages applied to the piezoelectric elements 92a to 92d in the embodiment. In other words, the optical low pass filter 9 does not need to be detached from the camera.

The optical low pass filter in the embodiment achieves the following advantages.

(a) An optical low pass filter adopting a structure having a plane parallel plate 91 constituted of optical glass or the like and caused to swing and vibrate by piezoelectric elements, which, unlike the optical low pass filter in the related art, does not require expensive birefringent plates, is provided. Namely, an optical low pass filter can be provided by using inexpensive optical glass.

(b) Since the image-capturing element 10 is not subjected to vibration, the image-capturing element 10 remains free of any adverse effect attributable to vibration.

(c) Light can be split in two directions with a single plane parallel plate 91, and also the light can be split along any splitting directions by adjusting the amplitudes and the phases of the piezoelectric elements 92a to 92d. In addition, the separation width, i.e., the cutoff frequency of the optical low pass filter 9, too, can be set to a desirable value by adjusting the amplitudes and the phases. As a result, a single type of optical low pass filter 9 can be used in conjunction with image-capturing elements assuming various pixel arrays and pixel pitches.

In other words, since the amplitudes and the phases of the piezoelectric elements 92a to 92d can be individually and freely set, various vibration patterns can be achieved with the piezoelectric elements 92a to 92d. As a result, various sets of filtering characteristics can be achieved, each in correspondence to one of a plurality of vibration patterns by using the single optical low pass filter 9. At least either the amplitude or the phase of at least one piezoelectric element changes from a given vibration pattern to another vibration pattern. The filtering characteristics refer to characteristics such as the cutoff frequency and the direction along which the filter is applied. Accordingly the optical low pass filter 9 can eliminate or remove a spatial frequency component which is equal to or higher than the predetermined cutoff frequency.

(d) The optical low pass function can be turned on/off with ease simply by turning on/off the voltages applied to the piezoelectric elements 92a to 92d. In addition, the optical low pass function can be turned on only when necessary so as to minimize the power consumption. For instance, it may be turned off while reproducing an image and it may be turned on by interlocking with a halfway press operation of the shutter release button. In other words, this structure enables various types of control.

While an explanation is given above in reference to the embodiment on an example in which the present invention is adopted in an optical low pass filter in a digital still camera, the present invention may be adopted equally effectively in an apparatus other than a digital still camera, as long as the apparatus is used to photograph an image by utilizing an image-capturing element. In addition, a vibration means for rocking and vibrating the plane parallel plate 91 may be constituted by using magnetostrictive elements, a vibrating motor, a voice coil motor or the like instead of piezoelectric elements.

The above described embodiment is an example and various modifications can be made without departing from the spirit and scope of the invention.

What is claimed is:

1. An optical low pass filter, comprising:
    a plane parallel plate that comprises a transparent optical member and is disposed frontward relative to an image-capturing surface of an image-capturing element that captures a subject image formed with a photographic optical system;
    a plurality of drive elements that are disposed at the plane parallel plate and operate along an optical axis of the photographic optical system; and
    a control unit that is connected to the plurality of drive elements and controls the plurality of the drive elements to be operated out of phase so as to eliminate a spatial frequency component in the subject image which is equal to or higher than a predetermined cutoff frequency.

2. An optical low pass filter according to claim 1, wherein: the control unit controls the plurality of the drive elements to be operated so as to alter an angle formed by the plane parallel plate and the image-capturing surface when an image is captured by the image-capturing element.

3. An optical low pass filter according to claim 2, wherein: the plurality of the drive elements are a plurality of oscillators.

4. An optical low pass filter according to claim 3, further comprising:
    an amplitude change unit that changes an amplitude of vibration of each of the plurality of oscillators.

5. An optical low pass filter according to claim 3, wherein: the control unit controls the plurality of oscillators so as to cause the subject image projected on the image-capturing surface to move on a straight locus, a circular locus or an elliptical locus by adjusting at least one of amplitudes and phases of the plurality of oscillators.

6. An optical low pass filter according to claim 1, wherein: the plane parallel plate achieves birefringence; and the control unit controls the plurality of the drive elements to be operated so as to eliminate the spatial frequency component in the subject image manifesting along a direction different from a direction along which a birefringent split is achieved at the plane parallel plate.

7. An optical low pass filter according to claim 6, wherein: the plurality of the drive elements are a plurality of oscillators; and
    there is further provided an amplitude change unit that changes an amplitude of vibration of each of the plurality of oscillators the plane parallel plate.

8. An optical low pass filter according to claim 1, wherein: the plane parallel plate comprises an isotropic transparent optical member.

9. An optical low pass filter according to claim 1, wherein: the plane parallel plate comprises isotropic glass.

10. An optical low pass filter according to claim 3, wherein: the control unit controls the plurality of oscillators to vibrate so as to cause the subject image to vibrate on the image-capturing surface of the image-capturing element.

11. An optical low pass filter according to claim 4, wherein: the amplitude is determined based upon the predetermined cutoff frequency.

12. An optical low pass filter according to claim 3, wherein: the control unit controls vibrations of the plurality of oscillators so as to achieve a first vibration pattern with which the plurality of oscillators are individually caused to vibrate with specific amplitudes and specific phases and a second vibration pattern in which at least one of the amplitude and the phase of at least one of the plurality of oscillators is altered relative to the first vibration pattern; and
    filtering characteristics achieved with the first vibration pattern are different from filtering characteristics achieved with the second vibration pattern.

13. An optical low pass filter according to claim 1, wherein: the control unit turns on a low pass filter function by turning on drive of the plurality of drive elements and turns off the low pass filter function by turning off the plurality of drive elements.

14. A camera, comprising:
    an image-capturing element that captures a subject image formed with a photographic optical system; and
    an optical low pass filter according to claim 1.

15. An optical low pass filter according to claim 1, wherein: the control unit sets a plurality of cutoff frequencies for the optical low pass filter respectively corresponding to a plurality of vibration patterns that are achieved by adjusting at least one of amplitudes and phases of the plurality of drive elements in operation.

16. An optical low pass filtering method, comprising:

disposing a plane parallel plate, that comprises a transparent optical member, frontward relative to an image-capturing surface of an image-capturing element that captures a subject image formed with a photographic optical system;

disposing at the plane parallel plate a plurality of drive elements that operate along an optical axis of the photographic optical system; and controlling the plurality of the drive elements to be operated out of phase so as to eliminate a spatial frequency component in the subject image which is equal to or higher than a predetermined cutoff frequency.

17. An optical low pass filtering method according to claim 16, wherein:

the plurality of the drive elements are controlled to be operated so as to alter an angle formed by the plane parallel plate and the image-capturing surface when an image is captured by the image-capturing element.

18. An optical low pass filtering method according to claim 16, wherein:

the plurality of the drive elements are a plurality of oscillators.

19. An optical low pass filtering method according to claim 18, further comprising:

providing an amplitude change unit that changes an amplitude of vibration of each of the plurality of oscillators.

20. An optical low pass filtering method according to claim 18, wherein:

the plurality of oscillators are controlled so as to cause the subject image projected on the image-capturing surface to move on a straight locus, a circular locus or an elliptical locus by adjusting at least one of amplitudes and phases of the plurality of oscillators.

21. An optical low pass filtering method according to claim 16, wherein:

the plane parallel plate achieves birefringence; and the plurality of the drive elements are controlled to be operated so as to eliminate the spatial frequency component in the subject image manifesting along a direction different from a direction along which a birefringent split is achieved at the plane parallel plate.

22. An optical low pass filtering method according to claim 21, wherein:

the plurality of the drive elements are a plurality of oscillators; and there is further provided an amplitude change unit that changes an amplitude of vibration of each of the plurality of oscillators the plane parallel plate.

23. An optical low pass filtering method according to claim 16, wherein:

the plane parallel plate comprises an isotropic transparent optical member.

24. An optical low pass filtering method according to claim 16, wherein:

the plane parallel plate comprises isotropic glass.

25. An optical low pass filtering method according to claim 18, wherein:

the plurality of oscillators are controlled to vibrate so as to cause the subject image to vibrate on the image-capturing surface of the image-capturing element.

26. An optical low pass filtering method according to claim 19, wherein:

the amplitude is determined based upon the predetermined cutoff frequency.

27. An optical low pass filtering method according to claim 18, wherein:

vibrations of the plurality of oscillators are controlled so as to achieve a first vibration pattern with which the plurality of oscillators are individually caused to vibrate with specific amplitudes and specific phases and a second vibration pattern in which at least one of the amplitude and the phase of at least one of the plurality of oscillators is altered relative to the first vibration pattern; and filtering characteristics achieved with the first vibration pattern are different from filtering characteristics achieved with the second vibration pattern.

28. An optical low pass filtering method according to claim 16, wherein:

a low pass filter function is turned on by turning on drive of the plurality of drive elements and is turned off by turning off the plurality of drive elements.

29. An optical low pass filtering method according to claim 16, wherein:

there are set a plurality of cutoff frequencies for the optical low pass filter respectively corresponding to a plurality of vibration patterns that are achieved by adjusting at least one of amplitudes and phases of the plurality of drive elements in operation.

\* \* \* \* \*